United States Patent Office 2,783,277
Patented Feb. 26, 1957

2,783,277
TERTIARY N,N-DIALKYL BENZYL AMINES

Rudolf Hiltmann, Wuppertal-Elberfeld, Germany, assignor to Schenley Industries, Inc., New York, N. Y., a corporation of Delaware No Drawing. Application February 17, 1954,
Serial No. 411,000

Claims priority, application Germany February 18, 1953

6 Claims. (Cl. 260—570.9)

Of the N-benzyl-dialkyl-amines substituted at the phenyl nucleus by alkoxy groups, N-(2-butyloxybenzyl)-diethylamine only has previously been mentioned in the literature. This compound is expressly stated to possess no local anaesthetic activity.

It has now been found that excellent local anaesthetics are obtained by producing, according to conventional methods, tertiary N.N-dialkyl-benzylamines of the general formula

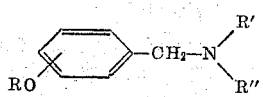

in which R means a lower alkyl group standing in 3- or 4-position and containing 3–5 carbon atoms, or an aralkyl group, and R' and R" are identical or different lower alkyl radicals. In contrast to the known N-alkylated 2- and 4-phenyl- or -cyclohexylphenyl-alkyl-amines, the new compounds are distinguished by their good local compatibility and by the absence of an uterus contracting activity. They are superior to 4-aminobenzoyl diethylaminoethanol by quicker reaction, a protracted activity and their stability upon heating in aqueous solution. Unlike 4-aminobenzoyl diethylaminoethanol or esters of similar constitution, they are not subject to fermentative decomposition in the living tissue.

The production of the tertiary amines obtainable according to the invention, may be accomplished by all processes which are suitable for preparing mixed tertiary aliphatic amines. Thus, for instance, reactive derivatives, for instance, halides or alkyl- or aryl-sulfonates of 3- or 4-alkyloxy- or -aralkyloxy-benzyl alcohols, may be reacted with lower aliphatic secondary amines in a manner known per se, or correspondingly substituted benzaldehydes may be reduced in the presence of aliphatic secondary amines in known manner, for instance, with aluminum amalgam or catalytically or with formic acid or alkyl formates according to Leuckart (compare M. L. Moore in Organic Reactions V, p. 301, New York 1949). Instead of using amines, the corresponding dialkylformamides may be employed. Furthermore, primary 3- or 4-alkyl-hydroxy- or -aralkyloxy-benzyl amines can be converted into the corresponding tertiary N.N-dialkylbenzyl-amines in the usual manner. This conversion may be accomplished either by reaction with reactive derivatives such as halides, alkyl- or aryl-sulfonates of lower aliphatic alcohols or by reductive alkylation, for instance by catalytic reduction or by reduction with aluminum amalgam or zinc dust and hydrochloric acid in the presence of aliphatic aldehydes or ketones or by the Leuckart process. Alkylation by reduction or the Leuckart process are especially suitable if the introduction of 1 or 2 methyl groups into secondary or primary amines is desired. Furthermore, it is possible to reduce correspondingly substituted ω-nitro-toluenes in the presence of aliphatic aldehydes, either catalytically or in any other known manner. Moreover, 3- or 4-alkyloxy- or aralkyloxybenzamides or -thiobenzamides, which are alkylated at the nitrogen atom, can be converted to tertiary amines in known manner, for instance catalytically or electrolytically or with aluminum amalgam or metal hydrides such as lithium aluminum hydride. Finally, it is possible to alkylate or aralkylate tertiary 3- or 4-hydroxy-N.N-dialkyl-benzylamines at the oxygen atom in known manner.

The resultant N.N-dialkylbenzylamines are colorless or slightly yellowish colored liquids which can be distilled in vacuo without decomposition and dissolve in organic solvents. With inorganic or organic acids, they yield well crystallized stable salts which easily dissolve in water with neutral reaction.

The following examples are given by way of illustration and not of limitation:

Example 1

Thirty-three grams of 4-n-butyloxy-benzylchloride and 26.5 grams of diethylamine in 100 cc. of toluene are refluxed for 5 hours. After cooling, the precipitated diethylamine hydrochloride is separated by filtering and the toluene is expelled in vacuo. The residue is taken up in about 2-n-hydrochloric acid, the hydrochloride solution extracted several times by shaking with ether and the base reprecipitated with potassium carbonate. The residue is taken up in ether, dried with potassium carbonate and the ether is distilled. By distilling the residue in vacuo, 4-n-butyloxy-N.N-diethylbenzylamine passes over as a colorless oil of the B. P. 126–127° C. under 3 mm. Hg. The easily water-soluble hydrochloride melts at 143–144.5° C.

4-n-butyloxy-benzyl-chloride employed as starting material may be prepared, for instance, as follows: 4-hydroxy-benzaldehyde is alkylated at the oxygen atom by means of n-butyl-bromide, the resultant 4-n-butyloxy-benzaldehyde (B. P. 120° C. under 3 mm. Hg) reduced catalytically with Raney nickel to 4-n-butyloxy-benzyl-alcohol (B. P. 135–137° C. under 3 mm. Hg) which is converted to 4-n-butyloxy-benzyl chloride (B. P. 107–110° C. under 2 mm. Hg) with thionyl chloride.

Example 2

Twenty-two and two-tenths grams of 4-n-propyl-oxybenzylchloride and 18 grams of diethylamine in 100 cc. of toluene are refluxed for 5 hours. After cooling, the precipitated diethylaminehydrochloride is separated by filtering and the toluene expelled in vacuo. The residue is taken up in about 2-n-hydrochloric acid, the hydrochloride solution extracted several times by shaking with ether and the base is reprecipitated with potassium carbonate. It is taken up in ether, dried with potassium carbonate and the ether is evaporated. By distilling the residue in vacuo, 4-n-propyloxy-N.N-diethyl-benzylamine passes over as a colorless oil of the B. P. 126–127° C. under 3 mm. Hg. The easily water-soluble hydrochloride melts at 153.5–154.5° C.

4-n-propyloxy-benzyl chloride employed as starting material can be prepared, for instance, as follows: 4-hydroxy-benzaldehyde is alkylated at the oxygen atom by means of n-propyl-bromide, the resultant 4-n-propyloxy-benzaldehyde (B. P. 114° C. under 3 mm. Hg) catalytically reduced with Raney nickel to 4-n-propyloxy-benzyl alcohol (B. P. 122° C. under 3 mm. Hg) which is converted to 4-n-propyloxy-benzyl chloride (B. P. 105° C. under 3 mm. Hg) with thionyl chloride.

Example 3

Twenty-seven grams of 3-n-butyloxy-benzylbromide and 17 grams of diethylamine in 100 cc. of benzene are refluxed for 5 hours. After cooling, the precipitated diethylamine hydrobromide is separated by filtering and the filtrate evaporated in vacuo. The residue is taken up in about 2 normal hydrochloric acid, the hydrochloride solution extracted several times by shaking with ether and the base reprecipitated with potassium carbonate. It is taken up with ether, dried with potassium carbonate and the ether is evaporated. By distilling the residue in vacuo 3-n-butyloxy-N.N-diethylbenzylamine is obtained as a colorless oil of the B. P. 127–129° C. under 3 mm. Hg. The easily water-soluble hydrochloride melts at 155° C.

3-n-butyloxy-benzylbromide employed as starting material can be prepared, for instance, as follows: 3-hydroxy-benzaldehyde is alkylated at the oxygen atom by means of n-butyl-bromide, the resultant 3-n-butyloxy-benzaldehyde (B. P. 116° C. under 2 mm. Hg) catalytically reduced with Raney nickel to 3-n-butyloxy-benzyl alcohol (B. P. 132° C. under 3 mm. Hg) which is converted to 3-n-butyloxy-benzyl bromide (B. P. 125° C. under 3 mm. Hg) with gaseous or aqueous hydrobromic acid.

*Example 4*

Twenty-eight and two tenths grams of 3-n-butyloxy-N-methyl-benzylamine and 16.1 grams of an aqueous formaldehyde solution (30%) in 200 cc. of methanol are catalytically reduced with Raney nickel at 60° C. under a pressure of 50 atmospheres. When the absorption of hydrogen is complete, the catalyst is separated by filtering and the solvent evaporated in vacuo. By distilling the residue in vacuo, 3-n-butyloxy-N.N-dimethyl-benzyl-amine goes over as a colorless oil of the B. P. 107–108° C. under 2.5 mm. Hg. The easily water-soluble hydrochloride melts at 150.5–152° C.

3-n-butyloxy-N-methyl-benzylamine employed as starting material can be prepared, for instance, by catalytic reduction (Raney nickel) of 3-n-butyloxy-benzaldehyde in methanol containing methylamine. B. P. 127° C. under 4 mm. Hg; M. P. of the hydrochloride 126–127° C.

*Example 5*

Twenty-three and two tenths grams of 4-benzyloxy-benzylchloride and 16 grams of diethylamine in 100 cc. of benzene are refluxed for 5 hours. After cooling, the precipitated diethylamine hydrochloride is separated by filtering and the filtrate evaporated in vacuo. The residue is taken up in about 2-n-hydrochloric acid, the hydrochloride solution shaken with ether several times and the base is subsequently reprecipitated with potassium carbonate. The base is taken up with ether, dried with potassium carbonate and the ether is evaporated. By distilling the residue in vacuo, 4-benzyloxy-N.N-diethyl-benzylamine is obtained as a colorless oil of the B. P. 174° C. under 3 mm. Hg. The easily water-soluble hydrochloride melts at 180–180.5° C.

4-benzyloxy-benzylchloride employed as starting material can be prepared, for instance, as follows: 4-hydroxy-benzyl alcohol is benzylated at the phenolic oxygen atom by means of benzyl chloride and the resultant 4-benzyl-oxybenzyl alcohol (M. P. 88.5–89° C.) is converted to 4-benzyl-oxybenzyl chloride (M. P. 80.5–82° C.) with thionyl chloride.

*Example 6*

Thirty-two and eight tenths grams of 4-n-propyloxy-benzaldehyde in 300 cc. of methanol are hydrogenated in the autoclave at 60–70° C. under a pressure of 50 atmosphere after addition of 34 grams of diethylamine by means of Raney nickel. When the absorption of hydrogen is complete, the catalyst is separated by filtering and the methanol evaporated. The residue is taken up in about 2-n-hydrochloric acid. The hydrochloride solution is extracted with ether several times to remove any 4-n-propyloxy-benzyl alcohol formed in the reaction, the base is precipitated with potassium carbonate solution and taken up in benzene. After drying over potassium carbonate, the benzene is evaporated and the residue distilled in vacuo whereupon 4-n-propyl-oxy-N.N-diethylbenzylamine of the B. P. 112–113° C. under 2 mm. Hg (described in Example 2) passes over. The hydrochloride melts at 153.5–154.5° C. and is identical to the salt described in Example 2.

*Example 7*

Forty-two and five tenths grams of 4-i-amyl-oxy-benzylchloride and 31 grams of diethylamine in 150 cc. of toluene are refluxed for 5 hours. After cooling, the precipitated diethylaminehydrochloride is separated by filtering and the toluene evaporated in vacuo. The residue is taken up in about 2-n-hydrochloric acid, the hydrochloride solution extracted with ether several times and the base reprecipitated with potassium carbonate. It is taken up in ether, dried with potassium carbonate and the ether is evaporated. By distilling the residue in vacuo 4-i-amyl-oxy-N.N-diethylbenzylamine passes over as a colorless oil of the B. P. 127–129° C. under 2.5 mm. Hg. The easily water soluble hydrochloride melts at 158–159° C.

4-i-amyloxy-benzyl chloride employed as starting material can be prepared, for instance, as follows: 4-hydroxy-benzaldehyde is alkylated at the oxygen atom by means of i-amylbromide, the resultant 4-i-amyloxy-benzaldehyde (B. P. 125–127° C. under 3 mm. Hg) catalytically reduced with Raney nickel to 4-i-amyloxy-benzyl-alcohol (B. P. 129–131° C. under 2 mm. Hg) which is converted to 4-i-amyloxybenzyl chloride (B. P. 114–115° C. under 2.5 mm. Hg) with thionyl chloride.

*Example 8*

A mixture of 36 grams of anhydrous formic acid and 44 grams of 4-n-butyloxy-benzaldehyde is dropped within 90 minutes into a mixture prepared with cooling from 44 grams of diethylamine and 41 grams of anhydrous formic acid, which is heated to 160–170° C. in a Vigreux flask connected to a condenser and a receiver, whereupon water and formic acid distil off slowly. The mixture is heated to 170–180° C. for a further 3 hours and the easily volatile ingredients are then distilled off in vacuo up to the B. P. 85° C. at 15 mm. Hg. The residue is taken up in 250 cc. of about 1-n-hydrochloric acid and the turbid solution washed with ether three times. The base is precipitated with potassium carbonate solution and taken up in benzene. After drying with potassium carbonate, the solvent is evaporated and the residue distilled in vacuo whereupon 4-n-butyloxy-N.N-diethylbenzylamine, described in Example 1, passes over as a colorless oil of the B. P. 128–130° C. under 4 mm. Hg. The hydrochloride melts at 143–144.5° C. and is identical with the salt described in Example 1.

*Example 9*

Into a mixture of 43 grams of dimethylformamide and 11.5 grams of anhydrous formic acid, which is heated to 160–170° C. in a Vigreux flask connected to a cooler and a receiver, a mixture of 36 grams of anhydrous formic acid and 44 grams of 4-n-butyl-oxybenzaldehyde is dropped within 90 minutes whereupon water and formic acid distil off slowly. The mixture is heated to 170–180° C. for a further 3 hours and the easily volatile ingredients are distilled off in vacuo. The residue is taken up in 250 cc. of 1-n-hydrochloric acid and the turbid solution is washed with ether three times. The base is precipitated with potassium carbonate solution and taken up in benzene. After drying with potassium carbonate, the solvent is evaporated and the residue distilled in vacuo whereupon 4-n-butyloxy-N.N-dimethylbenzyl amine goes over as a colorless oil of the B. P. 112–116° C. under 3 mm. Hg. The easily water soluble hydrochloride melts at 186–188° C.

*Example 10*

Twenty grams of 4-n-butyloxy-N-ethylbenzyl amine, 15 grams of ethyl iodide and 50 cc. of acetone are refluxed for 10 hours. After evaporating the acetone, the residue is taken up in water, rendered congo acid with dilute hydrochloric acid and washed with ether twice.

After that, the base is precipitated with potassium carbonate solution, taken up in ether and the ethereal solution dried with potassium carbonate. After evaporating the solvent, the residue is distilled in vacuo whereupon 4-n-butyl-oxy-N.N-diethylbenzylamine, described in Example 1, goes over as a colorless oil of the B. P. 130° C. under 4 mm. Hg. The hydrochloride has the M. P. 143° C.; in admixture with the salt described in Example 1, the melting point is not lowered.

The same 4-n-butyloxy-N.N-diethylbenzyl amine is obtained in the alkylation of 4-n-butyloxy-N-ethylbenzyl amine with p-toluene ethyl sulfonate.

4-n-butyloxy-N-ethylbenzyl amine employed as starting material is easily prepared by catalytical hydrogenation of 4-n-butyloxy-benzaldehyde in the presence of ethylamine by means of Raney nickel. B. P. 116–119° C. under 2.5 mm. pressure.

Example 11

Thirty-six grams of 3-n-butyloxy-benzylamine are reacted while cooling with 46 grams of anhydrous formic acid. After addition of 44 grams of formaldehyde solution (30%) the solution is heated on the water bath for 10–12 hours. After cooling the solution is made congo acid with 17 cc. of concentrated hydrochloric acid, evaporated to dryness in vacuo and the residue is dissolved in water. The base is precipitated from the clear solution with potassium carbonate solution and taken up with benzene. After drying with potassium carbonate and evaporating the solvent, the residue is distilled in vacuo whereupon 3-n-butyloxy-N.N-dimethylbenzylamine, described in Example 4, goes over at the B. P. 107–108° C. under 2.5 mm. Hg. The hydrochloride melts at 150.5–152° C. and is identical with the salt described in Example 4.

3-n-butyloxy-benzylamine employed as starting material can be obtained by the catalytical hydrogenation of 3-n-butyl-oxy-benzonitrile with Raney cobalt in methanolic ammonia. B. P. 111–112° C. under 2.5 mm. Hg. 3-n-butyloxy-benzonitrile (B. P. 114–116° C. under 3 mm. pressure) is easily accessible from the amide of 3-n-butyloxy-benzoyl chloride (M. P. 114–115.5° C.).

Example 12

Twenty-five grams of 3-n-butyloxy-benzoic acid diethylamide (B. P. 158° C. under 0.3 mm. Hg.), which is easily prepared from the acid chloride with diethylamine, are dissolved in 100 cc. of absolute ether and dropped with stirring into a solution of 9.2 grams of lithium aluminum hydride in 1200 cc. of absolute ether so that the ether slightly boils. After completion of the reaction, decomposition is induced by careful addition of water, and congo acid reaction is effected with sulfuric acid (20%). The aqueous solution is separated, washed with ether and the base is precipitated with 10-n-sodium hydroxide solution. After taking up with ether, drying the ethereal solution with potassium carbonate and evaporating the solvent, the residue is distilled in vacuo whereupon 3-n-butyloxy-N.N-diethyl benzyl amine, described in Example 3, passes over as a colorless oil of the B. P. 128° C. under 3 mm. pressure. The hydrochloride melts at 155° C. and is identical with the salt described in Example 3.

Example 13

Twenty-four grams of 3-n-butyloxy-benzoic acid-N.N-diethylamide are dissolved in a mixture of 240 cc. of sulfuric acid (40%) and 160 cc. of alcohol and electrolytically reduced with a lead cathode at 30–35° C., a current density of 0.1 ampere/cm.² and 18 volt. Sulfuric acid (25%) is used as anode liquid. When the electrolysis is complete, the alcohol is distilled off in vacuo and the sulfuric acid solution is washed with benzene twice. The base is precipitated with 10-n-sodium hydroxide solution, taken up in benzene and the benzene solution is dried with potassium carbonate. After expelling the solvent, the residue is distilled in vacuo whereupon 3-n-butyloxy-N.N-diethylbenzylamine, described in Example 3, passes over as a colorless oil of the B. P. 121–123° C. under 2 mm. Hg. The hydrochloride of the M. P. 155° C. is identical with the salt described in Example 3.

Example 14

Twenty-five grams of n-butylbromide is added in drops while stirring to a solution of 30 grams of 4-hydroxy-N.N-diethylbenzylamine-hydrochloride in 250 cc. of alcohol after addition of 43 grams of potassium carbonate, 2 grams of sodium iodide and 2 cc. of water; the solution is refluxed for 20 hours. After cooling the solution is suction filtered, evaporated in vacuo and the residue taken up in ether and water. The ethereal solution is separated, shaken with sodium hydroxide solution (5%) several times and washed neutral with water. After evaporating the solvent, the residue is taken up on about 2-n-hydrochloric acid, the congo acid solution washed with ether several times and the base precipitated with potassium carbonate solution. The base is taken up in benzene, dried with potassium carbonate, the solvent is evaporated and the residue distilled in vacuo whereupon 4-n-butyloxy-N.N-diethylbenzyl-amine, described in Example 1, passes over as a colorless oil of the B. P. 125–126° C. under 2.5 mm. Hg. The hydrochloride melts at 143–144.5° C. and is identical with the salt described in Example 1.

4-hydroxy-N.N-diethylbenzylamine-hydrochloride (M. P. 168–170° C.) employed as starting material is obtainable by the process described by E. Stedman for the preparation of the N.N-dimethyl compound (Soc. 1927, 1902).

Example 15

To a boiling solution of 460 grams of diethylamine in 1.5 liters of benzene there are gradually added while stirring 595 grams of a mixture of 2- and 4-n-butyloxy-benzylchloride obtained by choloromethylation of n-butylphenylether with formaldehyde and hydrochloric acid. The mixture of 2- and 4-n-butyloxybenzylchloride has a boiling point of 112–114° C. at a pressure of 3 mm. Hg. The reaction mixture is subsequently boiled for five hours while stirring. After cooling to room temperature the diethylaminehydrochloride which precipitates is removed by suction filtration and the filtrate stirred with 1.5 liters of about 2-n-hydrochloric acid. The aqueous solution, which is acid to Congo red is separated, washed with 0.5 liter of benzene, filtered by suction over kieselguhr and precipitated with a 50 percent aqueous potassium carbonate solution. The separated oil is recovered and the aqueous solution washed twice with 0.5 liter of benzene. The benzene solutions are added to the oil and dried over potassium carbonate. The benzene is then evaporated and the residue distilled in vacuo. 640 grams of a mixture of 2- and 4-n-butyloxybenzyl-N.N-diethylamine are obtained having a boiling point of 133–135° C. at a pressure of 4 mm. Hg.

640 grams of the amine mixture thus obtained are slowly added to 1280 cc. of isopropanol which contains a little less than the calculated amount of hydrochloric acid. The mixture is stirred and adjusted to a pH value of about 5 by adding a solution of hydrogen chloride in isopropanol. The product is allowed to crystallize while stirring and cooling with ice. It is then filtered by suction, washed first with 0.5 liter of icy cold isopropanol and finally with ether. It is then dried and 525 grams of pure 4-n-butyloxy-N.N-diethylaminebenzyl-hydrochloride of the melting point of 143.5–144° C. are obtained. By concentrating the mother solution and precipitating with ether a further 90 grams of a not quite pure product may be recovered, which are preferably added to the next batch.

I claim:
1. As a new chemical compound, a tertiary N,N-dialkylbenzylamine of the general formula

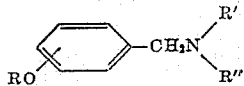

in which the RO group is in one of the 3 and 4 position, R is a member selected from the group consisting of lower alkyl radicals containing 3–5 carbon atoms and the benzyl radical, and R' and R'' are lower alkyl radicals.

2. As a new chemical compound, 3-n-butyloxy-N,N-diethylbenzylamine.

3. As a new chemical compound, 4-n-butyloxy-N,N-diethylbenzylamine.

4. As a new chemical compound, 4-benzyloxy-N,N-diethylbenzylamine.

5. As a new chemical compound, 4-n-propyloxy-N,N-diethlybenzylamine.

6. As a new chemical compound, 4-i-amyloxy-N,N-diethylbenzylamine.

References Cited in the file of this patent
UNITED STATES PATENTS

| | | |
|---|---|---|
| 2,506,588 | Goodson et al. | May 9, 1950 |
| 2,676,173 | Hiltmann et al. | Apr. 20, 1954 |

OTHER REFERENCES

McConbrey: "Jour. Chem. Soc." (1951) pp. 2931–5.

Wright et al.: "Jour. Org. Chem." (1946) vol. II, pp. 111–22.

Stedman: "Jour. Chem. Soc." (1927) pp. 1902–6.